March 15, 1960 C. W. CHILLSON 2,928,287
CONTROL MECHANISM
Filed Jan. 18, 1957 4 Sheets-Sheet 1
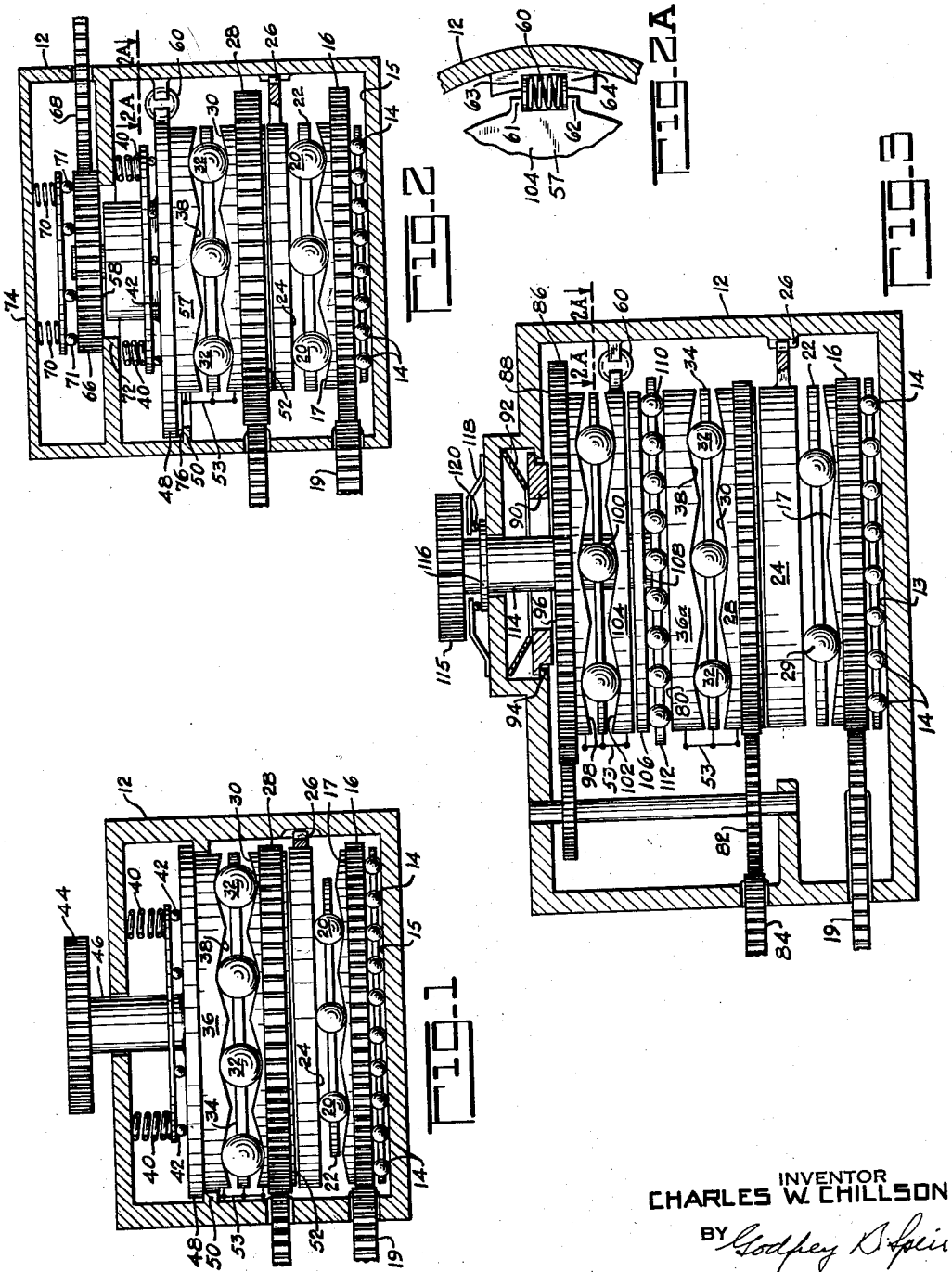
INVENTOR
CHARLES W. CHILLSON
BY
ATTORNEY

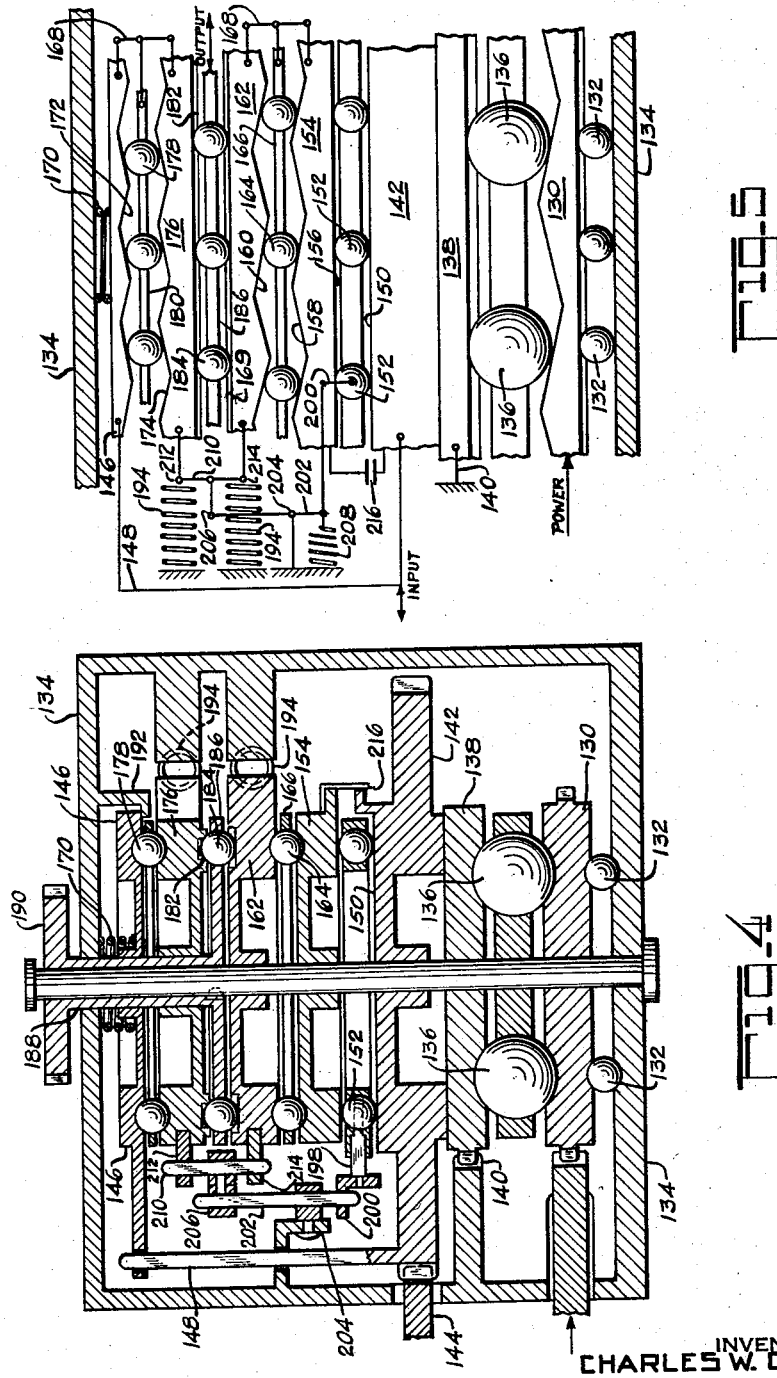

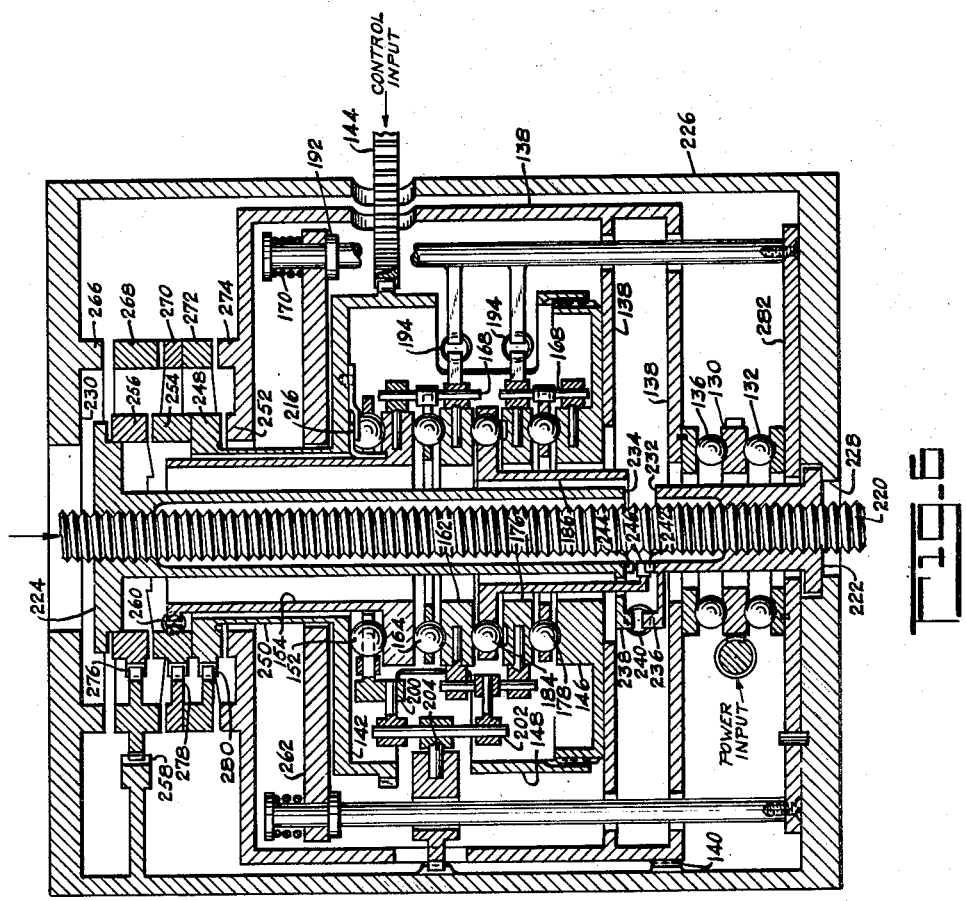

March 15, 1960
C. W. CHILLSON
2,928,287
CONTROL MECHANISM
Filed Jan. 18, 1957
4 Sheets-Sheet 4
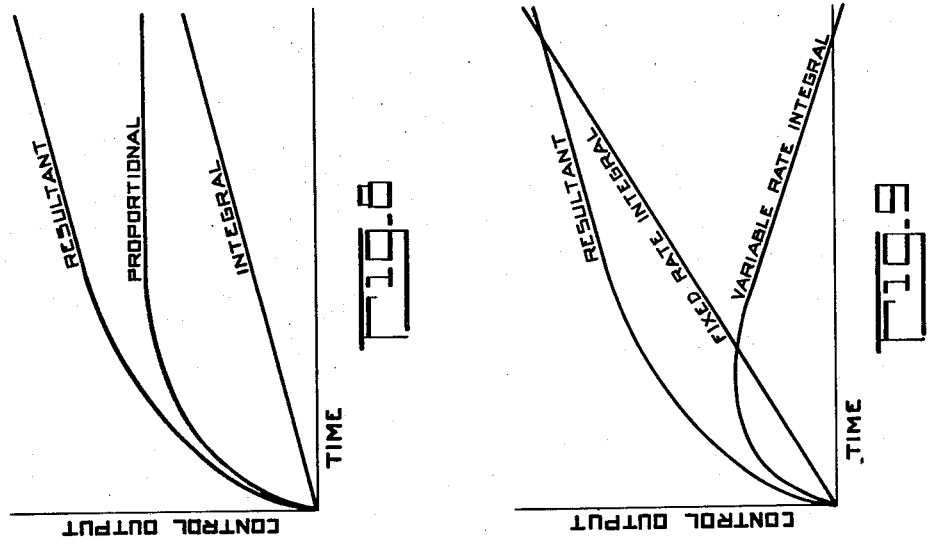
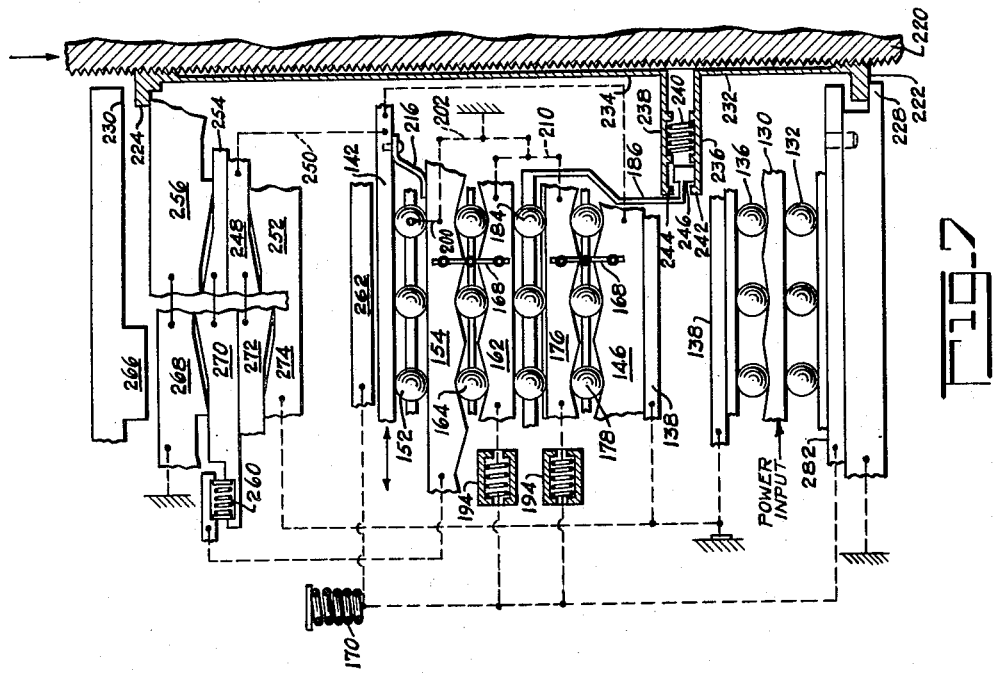
INVENTOR
CHARLES W. CHILLSON
BY
ATTORNEY United States Patent Office 2,928,287
Patented Mar. 15, 1960

2,928,287

CONTROL MECHANISM

Charles W. Chillson, Packanack Lake, N.J., assignor to Curtiss-Wright Corporation, a corporation of Delaware Application January 18, 1957, Serial No. 634,950

34 Claims. (Cl. 74—388)

This invention relates to control systems, and more particularly to all-mechanical control mechanisms of servo character which are adapted to produce output effort which is a desired mathematical function of the input to the mechanisms.

The invention includes a source of reciprocating mechanical power, a control input requiring minor amounts of force for its operation, an output member, and mechanical devices, controlled by the control input, which convert the reciprocating power to a powerful output of the desired characteristics and precisely controlled by the control input. The output member may be utilized to control any desired instrumentality, such as booster servo, or the speed control of a prime mover or powerplant. These specific instrumentalities are by no means limiting, as others will occur to those skilled in the art. The invention is particularly useful in direct association with the all-mechanical power servo-mechanisms of the sorts shown in my copending patent application Serial Number 605,015, filed August 18, 1956. An example of use of the invention with such a power boosting servo mechanism is shown and described herein.

The invention provides advantages which have not been realized by previous control systems, among others not mentioned, including:

(a) Positive, all-mechanical action.
(b) Precise, fast-acting control with designed-in-time-delay characteristics.
(c) Autonomy of design and freedom from external auxiliaries.
(d) Freedom from dependence on hydraulics, pneumatics, electrical apparatus.
(e) Inherent ruggedness and dependability.
(f) Freedom from critical friction devices and critical adjustments.
(g) Maximum efficiency and negligible power loss and heat rejection.

The apparatus of the invention may be arranged for virtually any arrangement of proportional control, integral control, combined integral and proportional, and the combining of desired relationships of integral and proportional control, to attain control precision with any desired degree of damping and mixing of the proportional and integral control signals. Thus, the control mechanism output can be used, for instance, to control, directly, a prime mover power or speed adjuster for modification or control of the speed thereof, without the addition of other mechanisms or networks to insert desired control characteristics. Further, the low control input force requirements of the invention enable actuation of the mechanism by low-output sensing devices, which ordinarily have greater sensitivity to changes in state of the prime mover or other power system, than those having large force output.

An understanding of the specific character of the invention may be gained from the attached drawings when read with the following detailed description, wherein similar reference characters represent similar parts.

The representations in the drawings are exemplary only, and are capable of considerable modification without departing from the spirit of the invention. They represent, however, simplified mechanisms, in somewhat schematic form, which illustrate principles and which provide a basis for the claims which define the scope of the invention.

In the drawings:

Fig. 1 is partial section through a first embodiment of the invention, adapted for proportional control, Fig. 2 is a partial section through a second embodiment of the invention, adapted for integral control, Fig. 2A is a fragmentary section on the lines 2A—2A of Figs. 2 and 3, Fig. 3 is a partial section through a third embodiment of the invention, adapted for proportional plus integral control without time delay characteristics, Fig. 4 is a partial section through a fourth embodiment of the invention, adapted for proportional plus integral control with controlled time delay, Fig. 5 is a developed segment of part of the mechanism of Fig. 4, with schematic representations of some components to assist in functional explanation, Fig. 6 is a partial section through a form of the invention having the operating features of Figs. 4 and 5, applied to control a power servo-mechanism, Fig. 7 is a developed segment of part of the mechanism of Fig. 6, and Figs. 8 and 9 are characteristic curves applicable to the invention.

Referring first to Fig. 1, I show a mechanism comprising a suitable frame or housing 12, the lower inner face of which is formed as a thrust bearing race 15 on which thrust balls 14 roll. These support a rotatable annular race 16, the upper face of which is waved as at 17, the race 16 being driven rotationally as by a power input gear 19, rotated steadily by a suitable source such as a power plant, not shown, with which the mechanism is associated. Balls 20, held in spaced relation by a retainer 22, roll on the waved race 17, and also bear on a non-rotating annular race 24 which is restrained from rotation by a key connection 26 with the housing 12. The lower face of the race 24 may be waved or not, as desired. If it is waved, additional mechanism would ordinarily be needed to coordinate the action of the balls 20 with the valleys and peaks of the race waves to secure full reciprocation of the race 24. As shown, the rotating race 16 causes the balls to rolls up and down the waves 17 and along the lower face of the race 24, causing the latter to rise and descend cyclically.

The upper face of race 24 is engageable, as it rises, with the lower face of a control input annulus 28, whose lower face is preferably flat, and whose upper face is formed as an annular waved cam, as at 30. Balls 32 engage the cam surface and are retained in properly spaced relation by a retainer 34. An annular member 36 lies above the balls 32 and has its lower face formed as an annular waved cam 38, like the cam 30. The member 36 is pressed or loaded downwardly by springs 40 reacting against the housing and acting on member 36 through a thrust bearing 42. Member 36 is the control output member in this embodiment, and may carry any suitable output driver, such as a gear 44 mounted on a shaft 46 secured to the member. Member 36 is limited in its downward movement by a flange 48 thereon engaging an abutment 50 on the housing 12. This limit stop is so arranged as to leave a clearance such as 52 between the lower components of the system at such times as the balls 20 are near or at the bottoms of the valleys in the waved race 17. A coordinating linkage 53 ties the members 34, 28 and 36 together to allow relative movement, and to hold the balls 32 to a similar position relation on the cam slopes 30 and 38.

When the member 24 rises, the clearance 52 is taken up and the member 28 is raised. If the balls 32 are in the bottoms of the valleys of cams 30 and 38, the member 36 may be raised a slight amount, but no rotation of member 36 is induced. However, if the control input member 28 has been rotated as by a gear 54 when the clearance 52 was present, balls 32 will have been displaced to opposite slopes of the cams 30 and 38. Then, when the member 28 is raised as previously noted, the member 28 will be locked from rotation by its frictional engagement with the non-rotating member 24, the rim 48 of member 36 will be raised from the stop 50, and turning torque will be exerted on the output member 36 because of the cam slopes 30 and 38. Thus, the members 36 and 44 will be rotated an amount proportional to the rotation of the input member 28, until the balls 32 are aligned with the bottoms of the cam slopes 30 and 38.

Since the cam slopes 30 and 38 are substantially symmetrical on both sides of the cam bottoms, the rotation of the output member 36 can be bi-directional, and will follow the input member 28 regardless of the direction in which it is rotated. Due to the reciprocation of the member 24 and the clearance 52 existing through part of the reciprocating cycle, there is an unloaded interval and a loaded interval for the input member 28. Signals are inserted during the unloaded interval so that the only effort required to insert a control signal is that needed to overcome friction and parts inertia. During the loaded interval, the previously inserted signal is used to move the output member with great force. This force is a function of the slopes of cams 30 and 38, the force exerted by the reciprocator 24 and the force exerted on output member 36 by the overload springs 40. It is, therefore, feasible to design the system so that the amplification of the input signal, force-wise, is very great.

The member 24 can be reciprocated at high frequency, either by the means shown or by other equivalent means, so that the lag of the output in responding to input signals is virtually negligible, output movement following input movement at a time interval equal to that required for one reciprocating cycle.

As stated, the arrangement of Fig. 1 produces output movement proportional to input movement. When there is no input movement, the output member is immobilized at the position at which the input member rests.

In the Fig. 2 embodiment, the invention is arranged so that the output member will continue to move so long as there is displacement of the input member in one direction or the other from a neutral position. This I call an integral control arrangement. The lower part of this mechanism may be substantially the same as that of the Fig. 1 embodiment. The same reference characters are used, and a description of these parts need not be repeated. The member 57, while generally like the output member 36 in Fig. 1, terminates in an upper face 58. Also, the member 57, instead of being capable of unlimited rotation in either direction, is restrained by a centering spring 60 coupled to the housing. This spring, as shown in Fig. 2A, bears at its ends on stops 61 and 62 formed on member 57 and on stops 63 and 64 formed on the housing. When the member 57 is indexed rotationally in either direction by the action of the reciprocator, or through the operation of the reciprocating member 28, acting through cams 30 and 38 and balls 32, it is urged to a neutral position by the spring 60. When the reciprocator descends and the member 57 is free of driving load (to be described) the spring 60 restores the member 57 to a neutral position.

Above the flat face 58 of member 57, is an output element 66 which may comprise a gear meshed with an external output gear 68. The element 66 is resiliently urged by springs 70 acting through a thrust bearing 71 against an abutment 72 forming part of the housing. The spring 70 reacts against another part 74 of the housing.

If there is no control signal input to member 28, the reciprocator 24 rises and descends, and during the upper part of its movement raises and lowers the elements 28, 32, 57 and 66 without causing rotation of any of them. When there is a control signal input, the cams 30 and 38 are displaced rotationally so that when the reciprocator 24 rises, member 57, after engaging output element 66, raises it and rotates it through the angle required to enable alignment of the bottoms of the cams 30 and 38. As the reciprocator descends, member 57 disengages element 66 and leaves it in the new position. As member 57 descends further, flange 48 engages stop 50, through an interposed ball thrust bearing 76, leaving the member 57 rotationally free, to be restored to its original position by the centering spring 60. The input member 28, however, may remain in its displaced position. Thus, when the reciprocator rises again, the same series of movements will repeat, resulting in sustained intermittent movements of the output element 66 so long as there is a signal displacement of the input member 28. When the input member is restored to its neutral position, wherein the bottom of its cams 30 lie opposite the bottoms of cams 38 when the latter are centralized, movement of output element 66 ceases.

This provides the integral control identified heretofore, where output movement continues over an extended time so long as an input displacement has been inserted in the system. Like the arrangement of Fig. 1, the control input and also the control output are bi-directional.

Fig. 3 shows an arrangement for combining the proportional and integral control arrangements of Figs. 1 and 2 on a purely additive or subtractive basis without feedback or time delay provisions. The latter provisions, normally necessary in practical control applications, are shown subsequently.

In Fig. 3, the reciprocator 24 and its actuation is the same in substance as previously described, and similar reference characters are applied. No repetition of description is deemed necessary. Also, the signal input and proportional control elements and their operation, including elements 28, 30, 32, 34, 38 and 53 are like those in prior figures. However, the output member of the proportional control system is shown as 36a, and is provided on its upper surface with an annular ball race 80 for a purpose to be described. The proportional control input is meshed with a control input gear 82 associated with the housing 12, which in turn is meshed with an external control input gear 84. Coupled to the gear 82, either in direct drive or at a desired drive ratio thereto, is another control input gear meshed with an integral control input member 86 above the assembly already described. This has an upper friction surface 88 engageable at times with a ring 90 pressed downwardly by a spring 92, downward movement of the ring 90 being limited by its engagement with an abutment 94 on the housing. When the reciprocator 24 is in its downward position, clearance 96 is left between the ring 90 and the components beneath it.

The member 86 is constructed with waved cams 98 like the waved cams 30 in Fig. 2. They engage balls 100, like balls 32, which in turn engage waved cams 102 of a member 104, the latter corresponding to elements 38 and 57 of Fig. 2. The lower face of member 104 abuts at times on a ring 106 whose lower face 108 is formed as an annular ball race engaging retained balls 110. Ring 106 could be integral with member 104. These balls also engage the annular race 80 already mentioned. Member 104 is resiliently urged to a neutral position by a centering spring 60, operating in the same fashion as previously described for Fig. 2. Races 80 and 108 are respectively the output elements of the proportional system and the integral system; their controlled movements are combined through the balls 110, a retainer 112 for balls 110 being rotated about the mechanism axis according to the sum of the motions of the output elements.

The retainer 112 is secured to a shaft 114 having a gear 115 or the like as the output element of the whole system. The shaft 114 is flanged at 116, the flange frictionally engaging the housing at times to prevent its rotation and being urged thereagainst by springs 118 acting through a thrust bearing 120. When the system is axially loaded due to rise of the reciprocator 24, balls 110, retainer 112 and shaft 114 are raised, disengaging the flange 116 from the housing and leaving the shaft 114 free to turn under the action of members 106 and 36a.

The elements 28—36a operate in the same manner as described in Fig. 1, causing the surface 80 to move in proportion to motion of the input member 28 as the reciprocator 24 cycles. The elements 86—106 operate in the same manner as the corresponding parts as described in Fig. 2, causing the surface 108 to move intermittently so long as a control input signal is inserted through the member 86. Thus, there is a proportional control response and an integral control response in the mechanism, which are combined by the summing differential constituted by the races 80 and 108, the balls 110 and the retainer 112. Accordingly, motion of the retainer, and consequently of the output shaft 114, represents the summation of the proportional and integral control components. The ratio of proportional and integral control is controllable in design by grooving one or the other of ball races 80 or 108, so that movements of balls 80 respond in different degree to movements of the races. Also, the system characteristics are modified by different drive ratios from the input gear 84 to the proportional input 28 and the integral input 86.

The system of Fig. 3 imposes the proportional correction in only one pulse of the expander which inhibits the needed time delay for a fully acceptable system. This system would be acceptable if the proportional term were continued in diminishing amount over a number of system pulses. If this were accomplished, the characteristic curves of Fig. 8 would be obtained. The curves therein represent the output of a servo mechanism for a step change in input, without reflecting the result of servo action toward washing out the step change as a result of "closed loop" system operation.

The resultant characteristic curve of Fig. 8 may be secured by the arrangement of the invention shown in Figs. 4—7, although it is arrived at by modification of the basic components of the mechanism. This arrangement utilizes a constant high rate integrating mechanism and a variable rate integrating mechanism, whose outputs are combined. The combined output of the two integrating mechanisms controls the variation of the variable rate integrating mechanism, diminishing it progressively over a period of time until it becomes equal and opposite to the constant rate integrator. A net residual constant integral signal is secured by a suitable gear ratio between the two integrator outputs. Fig. 9 shows the adding and subtracting sequence of the two integrators to secure the equivalent "proportional plus integral" output of Fig. 8.

Referring to Figs. 4 and 5, this arrangement of the invention includes a reciprocator assembly comprising a power driven waved input race 130 supported on a thrust bearing 132 in a housing 134. Retained balls 136 roll along the race 130 relative to a flat non-rotating race 138, which rises and descends on the balls as they travel over the waves of race 130. The race 138 is held from rotation by a spline connection 140 with the housing. This assembly comprises a vertical reciprocator, as shown. Coaxial with and above the race 138 is an input member 142, which is rotated by a control gear 144, according to a function such as speed error or the like of a system to be controlled. An additional input member 146 is arranged near the top of the mechanism, connected to move rotationally with member 142 by a strut 148. The upper face of member 142 comprises an annular race 150 engaged by balls or rollers 152, and upon which is assembled a member 154 having a lower annular face 156 and an upper waved cam 158. Facing cam 158 is a waved cam 160 of a member 162, and interposed between cams 158 and 160 is a group of balls 164 held in a retainer 166. The members 154 and 162, and the retainer 166, are connected by a pivoted link 168 which assures that the balls 164 will at all times have a set relation to the slopes, bottoms and tops of the waves of cams 158 and 160. That is, when the bottoms of the waves of the two cams lie opposite, the balls will lie at such bottoms; if the cams are relatively displaced, the balls will roll an equal distance up the opposed cam slopes.

The upper face of member 162 is formed with a race 169, this forming the output race for the variable integrating mechanism comprised of the elements lying therebelow.

Input member 146 is spring loaded downwardly by a spring 170 between it and the top of the housing 134. The member is formed on its lower face as a waved cam 172, opposite which lies a similar waved cam 174 on a member 176. Balls 178 lie between the cams, and are held in a retainer 180, connected to a link 168 by which the retainer and the members 146 and 176 are coordinated in their movements in the same manner as described in connection with members 154 and 162. The lower face of member 176 is formed as a grooved race 182, this lying opposite the upper race 169 of member 162. Balls 184 are disposed therebetween, held in a retainer 186, the retainer 186 comprising a disc which is secured to a shaft 188 and an output element such as a gear 190. The member 146 is limited in its downward motion by a stop 192, located so that when the reciprocator member 138 is in its lower region of travel, the various elements have axial freedom, and when the reciprocator is in its upper region of travel, the various elements are axially loaded against one another by the force exerted by the spring 170.

Both members 176 and 162 are elastically urged to a datum rotational position by centering springs 194 so that, when the reciprocator is down, the members will return to the datum position.

At least some of balls 152 have spindles 198 extending therefrom, carrying levers 200 at their outer ends. The end of the lever 200, as shown, engages a rod 202 swingable about a fixed pivot 204 and carrying a pivot 206 at its upper end. The rod 202 and the lever 200 are urged to a normally vertical position by a spring 208. The pivot 206 is secured to the central part of a yoke 210, whose ends are respectively pivoted at 212 and 214 to the output members 176 and 162 of the integrating mechanisms. It should be further noted that there is a light frictional coupling 216 between members 142 and 154. This completes the essential structure of the mechanism, and a functional explanation of it will now be given.

Assume that the control input 144 has been moved from its neutral position, to cause a rightward displacement (Fig. 5) of members 142 and 146, at an interval when the reciprocator is near the bottom of its stroke, when there is axial clearance or freedom between the stack of members. The rightward control movement of member 142 is transmitted to member 154 through coupling 216. Now, the reciprocator rises, member 138 engaging member 142 locking it and member 146 from rotation.

As the stack between members 142 and 146 is squeezed together, balls 164, through the engaged cam waves, urge member 162 rightwardly. Likewise, balls 178 urge member 176 rightwardly. The rightward movement of these members carries balls 184 and carrier 186 rightwardly, producing corresponding movement of the output element 190. The rightward movement of members 176 and 162 pulls the upper end of rod 202 rightwardly, forcing its lower end leftwardly due to pivot 204. This cranks balls 152 counterclockwise through levers 200, forcing member 154 to move leftwardly, thereby removing part of the original control signal therefrom, the amount depending on the geometry of the rod 202, pivot 204, lever 200 and diameter of ball 152. This has the effect of resetting the member 154 to some fraction of its original setting. The movement of the output member 186 will be correspondingly modified, by virtue of the summing differential action of races 168, 182 and balls 184.

As the reciprocator descends and leaves the members free of axial pressure, the output member 186 will retain the position imparted to it, but member 176 will reset due to its spring 194, member 162 will reset due to its spring 194, and lever 200 will reset due to its spring 208. Members 142 and 146 will remain displaced, since it was stated previously that the input setting was temporarily fixed.

On the next cycle of reciprocator rise, the member 176 repeats the same rightward movement as occurred during the initial cycle. Member 162, however, is called on to move a lesser amount rightwardly due to the resetting of the member 154 by action of the feedback linkage including rod 202, lever 200 and ball 152. In this second cycle, further feedback will occur, causing the output member 186 to move a lesser amount than it did during the first cycle. Further cycles will progressively shift member 154 to the left, actually reversing the shift of member 162 from cyclic rightward movement to cyclic leftward movement, eventuating in a leftward shift of member 162 which is equal and opposite to the rightward shift of member 176. Such action simply swings the link 210 about its central pivot, without effecting a swing of rod 202 about its fixed pivot 204, and thereby terminating successive feedback increments.

However, due to the fact that the summing differential faces 169 and 182 are different, net movement of the output member 186 will occur at each cycle of the reciprocator, the movement of these faces finally being equal and opposite.

Any resetting of the input members 142 and 146 will produce a new sequence of actions, in the same pattern as described, as the reciprocator cycles. This resetting may occur, through action of the controller, adjuster and mechanism being adjusted, when control input reflects the changed condition of the mechanism being adjusted, through closed loop action.

It may be appreciated from the foregoing that the combining of the fixed-increment integrator composed of members 172–176 with the variable-increment integrator composed of members 142, 152, 154, 164, 162 and linkages 210, 202 and 200, produces the same effect as a proportional plug integral control array, with a determinate time constant. Control inputs may, of course, be opposite to those described, with corresponding effect on the output. The arrangements of Figs. 4 and 5 are susceptible to considerable modification in details and construction, as well as variation in design and characteristics.

The mathematical approach of using two integrators to produce the same effect as an integrator plus a proportional mechanism is not new in this invention, except as to the type of mechanism used. A similar mathematical approach to another type of mechanism has been shown in Chillson et al. application Serial Number 577,229, filed April 10, 1956.

An example of a practicable all-mechanical power servo mechanism, using the control servo mechanism of Figs. 4 and 5, is shown in Figs. 6 and 7. The reference characters of Figs. 4 and 5 are applied to Figs. 6 and 7 where elements are similar or have similar function. The description of Figs. 6 and 7 will not repeat the control system in detail, but rather, will relate control system elements to the power system elements disclosed. The power system is of the same type as is shown in my application Serial Number 605,015, filed August 20, 1956.

The power system consists of a screw shaft 220, secured from rotation, and two rotatable nuts 222 and 224 threaded thereon. The mechanism is contained within a casing 226 through which shaft 220 passes, the casing having an abutment 228 against which nut 222 rests part of the time when load is axially down on the screw, and an abutment 230 against which nut 224 rests part of the time when the load is axially up on the screw. In the load down position, as shown, the nut 222 supports or holds the load except when nut 224 is actuated by the lifting mechanism to be described to lift the load. In the load up position, the nut 224 holds the load except when nut 222 is actuated by the lifting mechanism to force the load down. The mechanism shown allows of raising and lowering the load when the load is either up or down on the screw 220.

The reciprocator 132, 130, 136, previously described, comprises the power source to actuate the control servo mechanism already described, and is also coordinated to actuate the power servo system.

The two nuts 222 and 224 have extensions 232 and 234 which approach one another within the mechanism, the extensions carrying brackets 236 and 238 confining a spring 240. This spring allows the nuts to turn relative to each other in either direction, but continually urges them to a certain phase relation when one is free to move relative to the other. The extensions 236 and 238 are also provided with opposed clutch dogs 242 and 244, one or the other being engaged by a finger 246 carried by the output member 186 of the control servo mechanism.

As the reciprocator 130, 132, 136, 138 rises and descends, the control servo mechanism having the components as described in Figs. 4 and 5 operates to turn the output member 186 upon the insertion of a control signal to the members 144 and 148. With the load down on the screw 220, the finger 246 engages the dog clutch 242 associated with nut 222. Thus, rotation of member 186 rotates nut 222 when that nut is free to turn, advancing it up or down the screw depending on the direction of rotation. The advance of nut 222 occurs when the load is supported by nut 224 on the reciprocator.

Insertion of a control signal to the member 142, in addition to the functions already described, also rotates a wedge member 248 through a hollow shaft 250. This wedge member cooperates with a wedge member 252, non-rotatable, which is connected directly with the reciprocator member 138. When the control input 144 calls for load raising, the members 248 and 252 are relatively rotated and spread apart. Superimposed on member 248 is another pair of wedge members 254 and 256, the former resting on member 248 and the latter being engageable at times with the nut 224. The member 256 is constrained to non-rotation by a key connection 258, while member 254 is resiliently constrained by a spring 260 to follow rotation of the feedback member 154 of the control mechanism. These members 254 and 256 are also spread apart when the control input calls for load raising, as member 154 follows control input calls from member 142 through the friction connection 216.

Now, since the control call is assumed as for load raising, the wedges 248, 252, 254 and 256 have been spread apart. The reciprocator rises, whereby member 138 raises the wedge members, wedge member 256 engages and raises nut 224, and holding nut 222 is free to rotate. As the reciprocator rises, the control servo mechanism is compressed between member 138 and a member 262, held by loading springs 170. This provides the force necessary to operate the control servo mechanism and to rotate its output 186. The latter, connected to nut 222 through finger 246 and dog 242, rotates the nut down the screw a calculated amount. When the reciprocator descends the nut 222 in its new position engages the casing abutment 228 and supports the load, leaving the nut free to turn.

Since nuts 224 and 222 are resiliently urged to the same phase relation by spring 240, nut 224 when unloaded follows to the new rotational position of nut 222.

Repetitions of the cycle described are substantially the same, except that the feedback member 154 resets wedge member 259 when it is unloaded to avoid excessive rise of the nut 224. Also, the output 186 of the control servo mechanism adjusts the nut 222, when it is free, according to the proportional-plus-integral sequence previously set forth.

When load lowering is desired, the shape of the ramps on members 248, 252, 254 and 256 provide for only slight rise of the nut 224, enough to lift the nut 224 and to free the nut 222 for controlled rotation up the screw when the reciprocator expands. With nut 222 rotated up the screw, leaving greater clearance between it and the abutment 228, descent of the reciprocator lowers the load on nut 224 until nut 222 engages its abutment. Then, with the nut 224 free to rotate, it too rotates up the screw, through action of the spring 240. The lowering of the load is controlled, as before, to the proportional-plus-integral pattern, through the action of the control servo mechanism.

As stated before, the mechanism of Figs. 6 and 7 also provides for raising or lowering the load if the load direction is reversed. When load is reversed, nut 224 becomes the holding nut, resting at times on the casing abutment 230, and nut 222 becomes the lifting nut. Reaction for the lifting nut is had through an abutment 266 within the top of the casing. Four additional wedge members 268, 270, 272 and 274 correspond to and are secured for rotation with wedge members 256, 254, 248 and 252. Key connections 276, 278 and 280 respectively provide the rotating connection between the first three inner and outer wedge members, and allow relative axial movement therebetween. The outer wedge members support the frame member 138 on abutment 266, the reciprocator acting against the member and in turn acting against nut 222 through a plate 282. The latter is secured to plate 262 through struts 284 and the loading springs 270 and limit stops 192. The frame thus constituted shifts axially with change in load direction, but is held from rotation in the casing 226.

Operation of the system with the load directed upwardly follows the same principles as have already been stated. However, the finger 246 of the control servo output member 186 now engages dog 244 of nut 224, instead of dog 242 of nut 222.

It is necessary in the entire mechanism to design the various axial clearances carefully and to maintain rather close manufacturing tolerances on these clearances to assure optimum operation of the system. This embodiment of the invention, like the others, is capable of fairly high speed operation. A prototype, for instance, uses a reciprocator which operates at a cyclic rate of 30 per second, with a net rise in each cycle of around .050. This would enable a maximum rate of screw traverse of 1½ inches per second. The efficiency of the mechanism is high, since control and setting movements of the system are accomplished when components are unloaded, while actual shifting of load is accomplished by cam and roller action.

As previously stated, the arrangement of Figs. 6 and 7 is only an example of a power servo mechanism with which the control servo mechanism as shown in Figs. 4 and 5 may be used. Both parts of the system are susceptible to many design changes and rearrangements to adapt the invention to different and various environments and uses.

It may be restated here that the invention has the following characteristics and advantages:

(a) High force gain with high mechanical efficiency.

(b) All-mechanical construction with consequent ruggedness.

(c) Requires only a single mechanical power source or input to perform both control and power functions.

(d) Requires only very small forces for precise control of large loads.

(e) Requires small control force and movement for precisely controlling output elements speed.

(f) Uses components which are readily fabricated from conventional materials and by conventional machine tools and techniques.

(g) Has great flexibility in design to secured desired derivative type control characteristics.

(h) Utilizes relatively small and light parts, minimizing inertia and time lag in the operation of the mechanism.

(i) If torque requirements exceed output torque of control unit, unit idles without damage thereto.

While I have described my invention and shown it in several arrangements, it is to be understood that various modifications and changes may be made which still lie within the scope of the invention. I aim in the following claims to comprehend all such modifications and changes.

I claim:

1. A control mechanism comprising control input means including a control member movable in one direction to a control position and movable in another direction, a follower member adapted to be moved in said one direction at times by said control member, reciprocating means intermitttently movable in said other direction through a first range wherein said input member is out of contact with the reciprocating means and free to move in its one direction and through a second range wherein said input member is engaged by the reciprocating means and constrained against movement in said one direction while enforcing input member movement in said other direction, thereby enforcing said follower member to move in said one direction in conformance with corresponding movement of said first member.

2. A mechanism according to claim 1, including means to restore said follower member to its original position when said reciprocating means repeats its movement into said first range.

3. A mechanism according to claim 1, including means to secure said follower member in its attained position when said reciprocating means repeats its movement into said first range.

4. A mechanism according to claim 1, including means to restore said follower member to its original position when said reciprocating means repeats its movement into said first range, an output element driven by said follower member during driven movement thereof, and means to hold said output element in attained position during restoring movement of said follower member.

5. A control mechanism comprising a reciprocator, two members rotatable about the reciprocation axis having facing waved cams with a roller therebetween, an abutment spaced from said reciprocator disposed to hold one of said members at times, there being part of the reciprocator stroke during which the other of said members is free to rotate and another part of the stroke during which said other member is locked from rotation and pressed axially toward the one member by said reciprocator, said other member, during said latter part of the reciprocator stroke, being lifted from said abutment and forced to follow the rotational movement of said first member through the action of said cams and roller.

6. A mechanism according to claim 5, including means to restore said one member to its original position upon reciprocator return to the first part of its stroke.

7. A mechanism according to claim 5, including means to hold said one member in its attained position upon reciprocator return to the first part of its stroke.

8. A mechanism according to claim 5, including means to restore said other member to its original position upon reciprocator return to the first part of its stroke, and an output element driven by said one member to a new position each time said one member is moved by said other member.

9. A control mechanism comprising a plurality of jointly movable input members, a plurality of output members respectively cam-connected to said input members, all said members being stacked and the said movements thereof being in a direction normal to the stack axis, power input means, reciprocating means operatively connected thereto for actuating the stack, said reciprocating means having a partial range of reciprocation wherein the stack is left free for insertion of control movements of said input members, and having another partial range of reciprocation wherein said members are pressed together, whereby to enforce output member movement in conformance with input member movement, and means to combine the movement of said output members.

10. A mechanism according to claim 9 wherein said output member combining means comprises a summing differential having an output element movable according to the combined movements of said output members.

11. A mechanism according to claim 9 wherein each input member and each output member comprise a control set, the output member of one set including mechanism to hold it in an attained position, the output member of another set including mechanism to restore it to its original position and having a device to accumulate successive control movement thereof.

12. A mechanism according to claim 11 including a feedback connection from said output members to one of said input members to modify the control movement thereof.

13. A mechanism according to claim 9 including a feedback connection from said output members to one of said input members to modify the control movement thereof.

14. A control mechanism comprising a plurality of sets of members, each such set comprising an input member and an output member, the input member being controllably movable in one direction at times, and the output member being movable in the same one direction by the input member at other times, means to couple said input members together for actuation by a common input source, power input means, and reciprocating means operatively connected thereto operable to apply pressure and movement cycles to said sets, in a direction divergent from said one direction, and to enforce movement of said output members from said input members at said other times in said one direction.

15. A control mechanism comprising a power driven reciprocator and a plurality of sets of members alternately pressed together and relaxed by said reciprocator, each said set comprising an input member rotatable about the reciprocation axis and an output member similarly rotatable, said members comprising cams connected together for transmitting input member rotational motion to said output member upon axial pressure thereon from said reciprocator, means in said sets to move their output members according to the time integral of the position of their input members, and means connecting the several output members of said sets to sum the movements thereof.

16. A mechanism according to claim 15 including a feedback connection from said output members to modify the time integrating action of one of said sets.

17. A control mechanism comprising a power driven reciprocator and a plurality of sets of members alternately pressed together and relaxed by said reciprocator, each said set comprising input and output members rotatable about the reciprocation axis, said members comprising cams connected together for transmitting input member rotational motion to respective output members upon axial pressure thereon from said reciprocator, a subtracting differential incorporated in one of said sets, means to urge said output members to their original position upon reciprocation relaxation, a summing differential having other than 1:1 ratio driven by said output members upon reciprocation pressure on said sets and a differential feedback linkage connecting said output members with one another and controlling said subtracting differential to reset the latter upon each cycle of reciprocation.

18. A mechanism according to claim 17 including a friction drive across said subtracting differential.

19. The combination of the mechanism of claim 1 with a pair of alternately operable nuts and a screw engaged thereby, said nuts being relatively rotatable, spring means urging said nuts to a certain relative position, and a driving connection from said follower member to one of said nuts.

20. The combination of the mechanism of claim 5 with a pair of alternately operable nuts and a screw engaged thereby, said nuts being relatively rotatable, spring means urging said nuts to a certain relative position, and a driving connection from said other member to one of said nuts.

21. The combination of the mechanism of claim 9 with a pair of alternately operable nuts and a screw engaged thereby, said nuts being relatively rotatable, spring means urging said nuts to a certain relative position, and a driving connection from said coupling means to one of said nuts.

22. The combination of the mechanism of claim 14 with a pair of alternately operable nuts and a screw engaged thereby, said nuts being relatively rotatable, spring means urging said nuts to a certain relative position, and a driving connection from said output members to one of said nuts.

23. The combination of the mechanism of claim 15 with a pair of alternately operable nuts and a screw engaged thereby, said nuts being relatively rotatable, spring means urging said nuts to a certain relative position, and a driving connection from said connecting means to one of said nuts.

24. The combination of the mechanism of claim 17 with a pair of alternately operable nuts and a screw engaged thereby, said nuts being relatively rotatable, spring means urging said nuts to a certain relative position, and a driving connection from said summing differential to one of said nuts.

25. A control mechanism comprising power input means, a reciprocator operatively connected to the power input means and a plurality of sets of members alternately pressed together and relaxed by said reciprocator, each set comprising an input member rotatable about the reciprocation axis and an output member similarly rotatable, said sets including cams connected together for transmitting input member rotational movement to said output members upon axial pressure on said sets from said reciprocator, and means connecting the output members of said sets to sum the movements thereof.

26. A mechanism according to claim 25 wherein both said sets include means whereby the movement of respective output members are repetitive for any set movement of said input members.

27. A mechanism according to claim 25 wherein one of said sets includes means to cause its output member to repeat input movements in diminishing degree upon successive reciprocator cycles for a set movement of its input member.

28. A mechanism according to claim 25 wherein one of said sets includes means to cause its output member to move to a lesser degree and then to reverse its movement upon successive reciprocator cycles, for a set movement of its input member.

29. A mechanism according to claim 25 wherein one of said sets includes means to cause its output member to repeat input member movements upon successive reciprocator cycles, for a set movement of its input member, and wherein the other set includes means to cause its output member to move to a lesser degree and then to reverse its movement upon successive reciprocator cycles, for a set movement of its input member.

30. A mechanism according to claim 29 wherein the input members of said sets are interconnected for joint operation.

31. A mechanism according to claim 15 in combination with a pair of alternately operable nuts and a screw engaged thereby, said nuts being relatively rotatable, spring means urging said nuts to a certain relative position, a driving connection from said summing connecting means to one of said nuts, and wedge means operated by said input members and operating in conjunction with said nuts to raise and lower said screw.

32. A mechanism according to claim 25 in combination with a pair of alternately operable nuts and a screw engaged thereby, said nuts being relatively rotatable, spring means urging said nuts to a certain relative position, a driving connection from said summing connecting means to one of said nuts, and wedge means operated by said input members and operating in conjunction with said nuts to raise and lower said screw.

33. A control device comprising control input means, power input means, reciprocating means operatively connected thereto out of contact with the control input means at times and in contact with the control input means at other times, said control input means including waved cam surface elements and roller means thereon positionable by the cam surface elements when the reciprocating means is out of contact with the control input means, follower means including waved cam surfaces engaging the roller means and actuated by the reciprocating means to positions determined by the positioning of said roller means, and output means controlled by the follower means.

34. A control mechanism comprising a plurality of sets each including a rotationally mounted input member and a rotationally mounted output member cam-connected to the input member, all the members being stacked and rotations thereof being in a direction normal to the stack axis, power input means, reciprocating means operably connected thereto for actuating the stack, said reciprocating means having a partial range of reciprocation wherein the stack is left free for insertion of control movements of said input members, and having another partial range of reciprocation wherein said members are pressed together, whereby to enforce output member movement in conformance with input member movement, means to sum the movement of said output members, one of said sets including means to cause its output member to repeat input member movements upon successive reciprocator cycles for a set movement of its input member, another set including means to cause another output member to move to a lesser degree and then to reverse its movement upon successive reciprocator cycles for a set movement of its input member, a pair of alternately operable nuts and a screw engaged thereby, said nuts being relatively rotatable, spring means urging said nuts to a certain relative position, a driving connection from said summing means to one of said nuts, and wedge means operated by said input members and operating in conjunction with said nuts to raise and lower said screw.

References Cited in the file of this patent

UNITED STATES PATENTS

| | | |
|---|---|---|
| 2,151,094 | Fiorentino | Mar. 21, 1938 |
| 2,401,794 | Pratt | June 11, 1946 |
| 2,572,523 | Schaefe | Oct. 23, 1951 |
| 2,605,854 | MacDuff | Aug. 5, 1952 |
| 2,617,949 | Leland | Nov. 11, 1952 |